(12) United States Patent
Amara et al.

(10) Patent No.: US 6,674,743 B1
(45) Date of Patent: Jan. 6, 2004

(54) METHOD AND APPARATUS FOR PROVIDING POLICY-BASED SERVICES FOR INTERNAL APPLICATIONS

(75) Inventors: Satish Amara, Mount Prospect, IL (US); Michael Freed, Arlington Heights, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/475,855

(22) Filed: Dec. 30, 1999

(51) Int. Cl.⁷ .............................................. H04L 12/28
(52) U.S. Cl. ..................... 370/351; 370/389; 370/392; 709/228
(58) Field of Search ................................ 370/229–235, 370/351, 389–392, 412–418, 428, 401, 402, 465, 466; 709/227, 228, 238, 240

(56) References Cited

U.S. PATENT DOCUMENTS

| | | | |
|---|---|---|---|
| 5,473,607 A | 12/1995 | Hausman et al. | 370/85.13 |
| 5,528,595 A | 6/1996 | Walsh et al. | 370/85.13 |
| 5,530,703 A | 6/1996 | Liu et al. | 370/85.13 |
| 5,541,911 A | 7/1996 | Nilakantan et al. | 370/13 |
| 5,606,668 A | 2/1997 | Shwed | 395/200.11 |
| 5,761,424 A | 6/1998 | Adams et al. | 395/200.47 |
| 5,790,554 A | 8/1998 | Pitcher et al. | 370/471 |
| 5,802,320 A | 9/1998 | Baehr et al. | 395/200.79 |
| 5,835,726 A | 11/1998 | Shwed et al. | 395/200.59 |
| 5,835,727 A | 11/1998 | Wong et al. | 395/200.68 |
| 5,878,231 A | 3/1999 | Baehr et al. | 395/200.75 |
| 5,884,025 A | 3/1999 | Baehr et al. | 395/187.01 |
| 5,889,953 A | 3/1999 | Thebaut et al. | 395/200.51 |
| 5,889,958 A | 3/1999 | Willens | 395/200.59 |
| 5,951,649 A | 9/1999 | Dobbins et al. | 709/238 |
| 5,983,270 A | 11/1999 | Abraham et al. | 709/224 |
| 6,104,700 A * | 8/2000 | Haddock et al. | 370/235 |
| 6,157,955 A * | 12/2000 | Narad et al. | 709/228 |

FOREIGN PATENT DOCUMENTS

| | | |
|---|---|---|
| WO | 9840987 | 9/1998 |
| WO | 9911003 | 3/1999 |

OTHER PUBLICATIONS

Corbridge et al, Packet Filtering in an IP Router, pp. 227–232, LISA–V—Sep. 30–Oct. 3, 1991.*
Wakeman et al, Implementing Real Time Packet Forwarding Policies using streams, pp. 1–12, Nov. 14, 1994.*
"IPSec Network Security Commands," http://www.cisco.com/univercd/cc/td/doc/products/software/ios120/12cgcr/secur_r/srprt4/sripsec.htm, pp. 1–45 (1998).
R. Rajan, S. Kamat, Internet Engineering Task Force (IETF), Internet Draft, "A Simple Framework and Architecture for Networking Policy," draft–rajan–policy–framework–00.txt, May 23, 1999, pp. i–xxiii.
H–W. Braun, Network Working Group, Request for Comments: 1104, "Models of Policy Based Routing," Jun. 1989, pp. 1–10.
D, Estrin, Network Working Group, Request for Comments: 1125, "Policy Requirements for Inter Adminstrative Domain Routing," Nov. 1989, pp. 1–21.
D. Clark, Network Working Group, Request for Comments: 1102, "Policy Routing in Internet Protocols," May 1989, pp. 1–22.

* cited by examiner

*Primary Examiner*—Dang Ton
*Assistant Examiner*—Frank Duong
(74) *Attorney, Agent, or Firm*—McDonnell Boehnen Hulbert & Berghoff

(57) ABSTRACT

A packet-forwarding device for providing policy-based services has at least a first interface, a second interface, and a packet forwarder for forwarding external packets between the first and second interfaces. The packet-forwarding device also runs internal applications that may be remotely accessed. The first and second interfaces transmit and receive internal and external packets, the internal packets being those packets generated or received by the internal applications during remote access, and the external packets being those packets destined for devices other than the packet-forwarding device. The packet forwarder forwards external packets between the first and second interfaces. An internal interface forwards internal packets between the internal applications and the first and second interfaces, and a policy engine logically connected to the internal interface applies a policy to the internal packets.

48 Claims, 3 Drawing Sheets

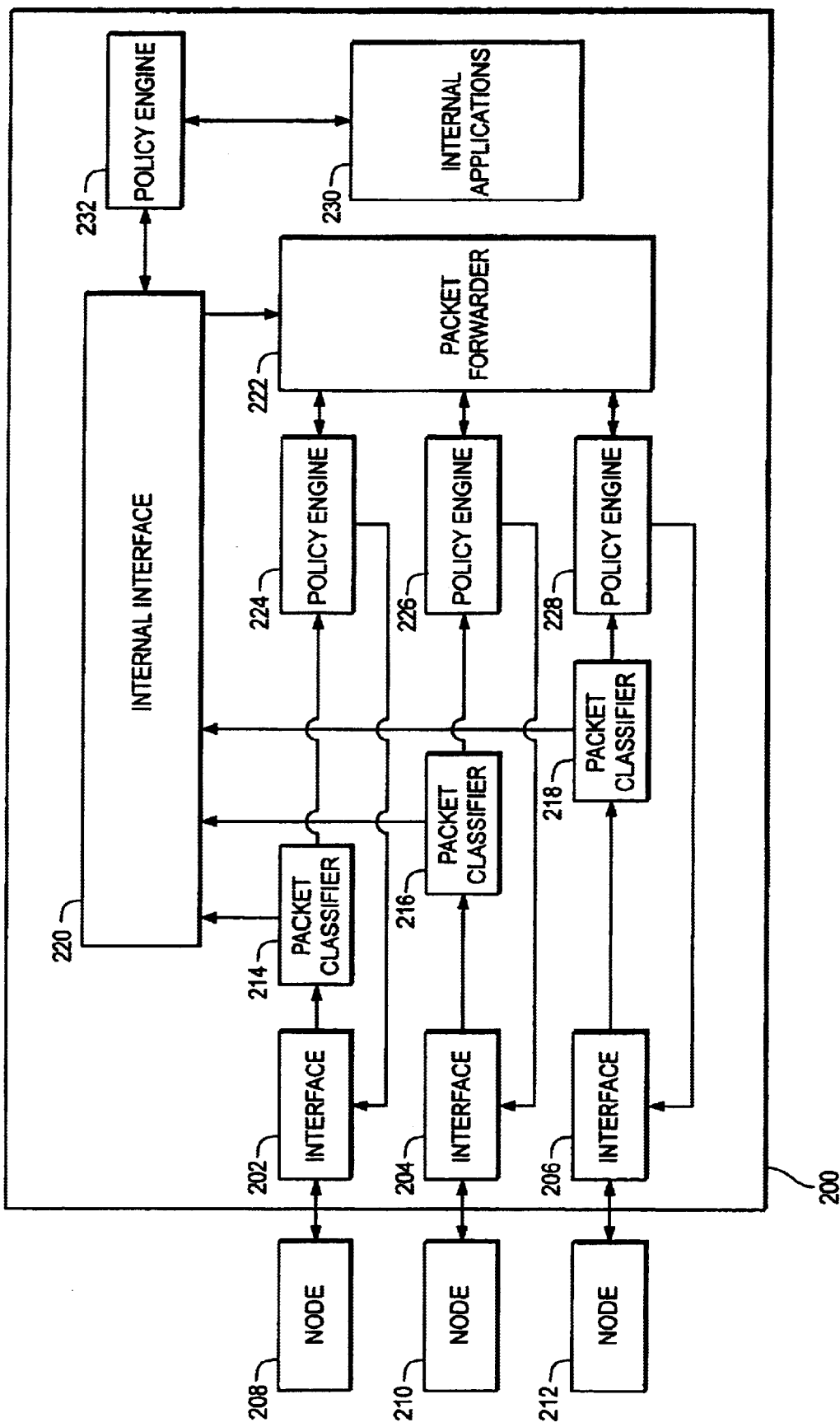

METHOD AND APPARATUS FOR PROVIDING POLICY-BASED SERVICES FOR INTERNAL APPLICATIONS

BACKGROUND OF THE INVENTION

A. Field of the Invention

This invention relates to the field of digital telecommunications. More particularly, this invention relates to a method and apparatus for applying policies in packet forwarding devices, such as routers and remote access servers.

B. Description of Related Art

Packet-switched networks, such as the Internet, typically include one or more packet forwarding devices, such as routers or remote access servers. Viewed at the simplest level, a router is a device having a plurality of interfaces, with each interface typically connected to a wide area network (WAN), a local area network (LAN), or a host. Internally, the router forwards packets from one interface to another based on the destination address contained in the header of each packet. A remote access server is similar to a router, except that, in addition to interfaces to WANs and/or LANs, a remote access server also includes one or more interfaces to the public switched telephone network (PSTN) to provide dial-in access to the network. Remote access servers also forward packets from one interface to another based on the destination addresses of the packets.

Increasingly, routers and remote access servers are also performing more sophisticated handling of packets than simply routing them on the basis of destination address. In particular, some packets may be selected for special treatment in order to provide "policy-based services." "Policy-based services" encompass any disposition of packets that involves more than simply routing them based on their destination addresses. For example, routers and remote access servers may perform packet filtering, in which certain packets are dropped, diverted, and/or logged. The router or remote access server may also perform network address translation (NAT), in which the source and/or destination addresses are changed. Certain packets may be encrypted or decrypted, such as provided for in the IPsec protocols. Finally, certain packets may be prioritized in the queue of the router or remote access server in order to provide a particular quality of service (QoS) level. Many other types of special handling of packets could also be performed.

To identify the packets that are to be subject to such special handling, the router or remote access server typically examines more than the destination address of the packet. In general, the packet-forwarding device examines one or more "selector fields" within each packet, such as the source address, destination address, source port, destination port, and protocol type. User name, more particularly the IP address allocated to a particular user, may also be used as a selector filed in remote access servers. The packet-forwarding device then enforces a "policy" by applying a set of rules to packets whose selector fields meet predefined criteria. The rules specify how the packets are to be handled. As a result of this policy enforcement, packets may be dropped, logged, translated, encrypted, decrypted, or prioritized, if the selector fields within the packets match certain predefined criteria.

Typically, the "policy" is applied to all interfaces of the packet-forwarding device. For example, Abraham et al., U.S. Pat. No. 5,983,270 discloses a network server through which all traffic between a LAN and the Internet passes. A filter engine in the network server applies a policy, embodied in a set of rules, to all outbound packets transmitted from the LAN to the Internet and to all inbound packets from the Internet to the LAN.

Similarly, Haddock et al., PCT Publication No. WO 99/11003 discloses a packet-forwarding device having a comparison engine. The comparison engine examines the packets arriving at each input port to determine with which traffic group each packet is associated, the traffic groups defining different QoS levels.

A packet-forwarding device 10 that typifies the prior art approach of applying policies to packets is shown in FIG. 1. FIG. 1 is a functional block diagram in which arrows illustrate the flow of packets between functional blocks. Device 10 may be a router, a remote access server, or other such device that forwards packets. Device 10 includes interfaces 12, 14, and 16, that connect device 10 to nodes 18, 20, and 22, respectively. Nodes 18–22 may represent hosts connected via a LAN or WAN or via the PSTN. Nodes 18–22 may also represent other packet forwarding devices. Although device 10 is shown in FIG. 1 with three interfaces, device 10 may, in general, have a greater or fewer number of interfaces.

As indicated by the double-headed arrows, interfaces 12–16 are able to send packets to and to receive packets from nodes 18–22, respectively. Interfaces 12–16, in turn, are logically connected to a packet forwarder 24 via policy engines 26, 28, and 30. Internal applications 32 are also logically connected to packet forwarder 24. Internal applications 32 include the applications on device 10, such as applications for controlling and configuring device 10, that are accessible remotely, such as by SNMP or by Telnet.

Packet forwarder 24 receives packets forwarded by interfaces 12–16, via policy engines 26–30, and by internal applications 32. Packet forwarder 24, in turn, is able to forward packets to internal interfaces 12–16, via policy engines 26–30, and to internal applications 32. Packet forwarder 24 performs a routing functionality. Specifically, packet forwarder 24 determines, for each packet it receives, whether to forward the packet to one or more of interfaces 12–16 and/or internal applications 32. Packet forwarder 24 makes this routing determination for each packet based on the packet's destination address. Typically, packet forwarder 24 has access to routing tables that specify where to send each destination address. Normally, packet forwarder 24 will forward a packet to internal applications 32 when the packet's destination address matches one of the packet-forwarding device's own IP addresses.

Policy engines 26–30 apply policies to all packets forwarded between interfaces 12–16 and packet forwarder 24. In this process, policy engines 26–30 trap each packet and examine various selector fields in each packet, such as source address, destination address, source port, destination port, and protocol type. Based on this information, policy engines 26–30 apply a set of rules that specify the manner in which the packets are to be handled. In general, policy engines 26–30 may be separately configured so as to apply different policies.

The problem with this approach is that there is a high overhead associated with applying policies to all incoming and outgoing packets. This high overhead may increase the latency of each packet and may degrade the throughput of the packet-forwarding device. Another disadvantage with the prior art approach is the time and effort required to develop and manage policies for each interface. Finally, the overhead and management difficulties serve to limit the complexity of the policies that a packet-forwarding device can apply.

SUMMARY OF THE INVENTION

In a first principal aspect, the present invention provides a method for providing policy-based services in a packet-forwarding device running an internal application and having a first interface and a second interface. The internal application generates internally-generated packets. A policy is applied to the internally-generated packets, and the internally-generated packets are forwarded to the first interface. External packets are received at the second interface, and these external packets are forwarded to the first interface without applying the policy to them.

In a second principal aspect, the present invention provides a method for providing policy-based services in a packet-forwarding device running an internal application and having a first interface and a second interface. Incoming packets, each of which has a source address, are received at the first interface. The incoming packets are classified as internally-destined packets if their source addresses are in a first set of addresses and as external packets if their source addresses are in a second set of addresses. A policy is applied to the internally-destined packets, and the internally-destined packets are forwarded to the internal application. However, the external packets arc forwarded to the second interface without applying the policy to them.

In a third principal aspect, the present invention provides a packet-forwarding device comprising first and second interfaces for transmitting and receiving packets, an internal application running on the packet-forwarding device, an internal interface logically connected to the internal application, a packet forwarder logically connected to the first and second interfaces, and a policy engine logically connected to the internal interface and the internal application. The internal application generates internally-generated packets and uses internally-destined packets. The internal interface forwards the internally-generated packets to the first interface and forwards the internally-destined packets to the internal application. The packet forwarder forwards packets between the first and second interfaces. The policy engine applies a policy to internal packets, the internal packets being selected from the group consisting of internally-generated packets and internally-destined packets.

In a fourth principal aspect, the present invention provides an improvement to a packet-forwarding device. The packet-forwarding device has a first interface, a second interface, a packet forwarder forwarding packets between the first and second interfaces, and runs an internal application. The internal application generates internally-generated packets and uses internally-destined packets. The improvement comprises an internal interface logically connected to the internal application and a policy engine logically connected to the internal interface. The internal interface forwards internal packets, the internal packets being selected from the group consisting of internally-generated packets and internally-destined packets. The policy engine applies a policy to the internal packets.

BRIEF DESCRIPTION OF THE DRAWINGS

FIG. 3 is a functional block diagram of a packet-forwarding device in accordance with a second preferred embodiment of the present invention

DETAILED DESCRIPTION OF THE INVENTION

Figure 1:
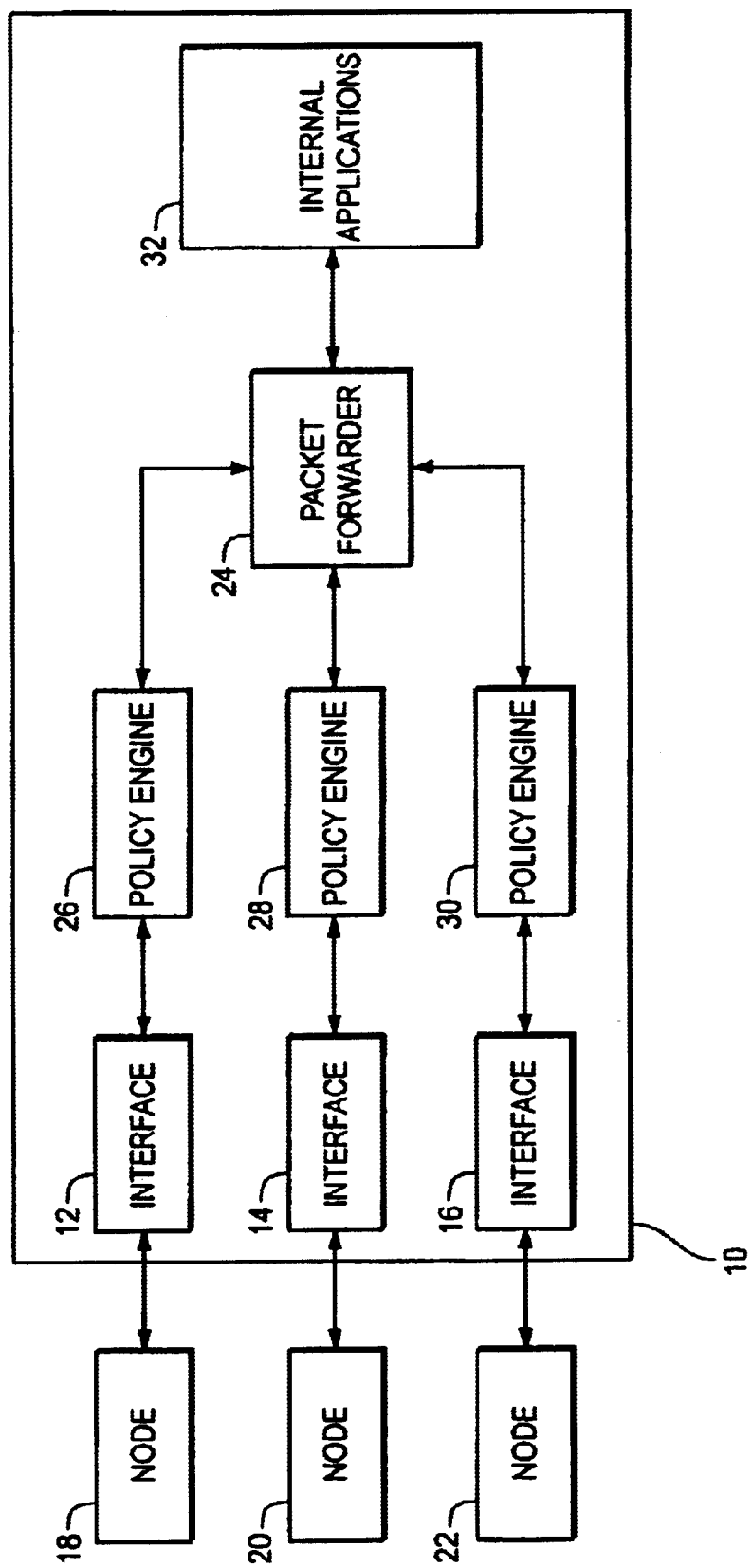
FIG. 1 is a functional block diagram of a packet-forwarding device typifying the prior art approach of applying policies.
Figure 2:
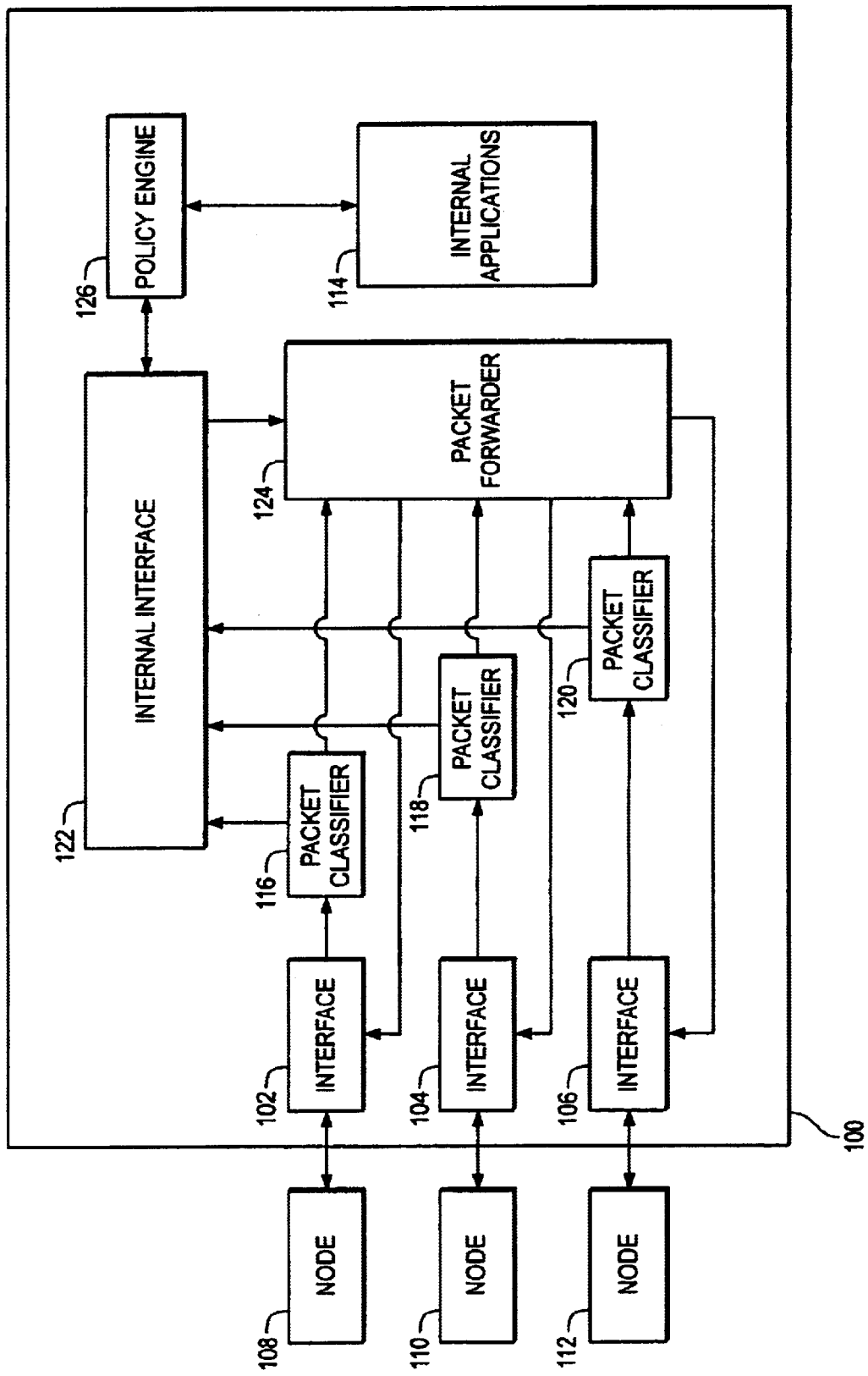
FIG. 2 is a functional block diagram of a packet-forwarding device in accordance with a first preferred embodiment of the present invention.

FIG. 2 is a functional block diagram showing a packet-forwarding device 100 in accordance with a first preferred embodiment of the present invention. The arrows in FIG. 2 illustrate the flow of packets between functional blocks and, thus, the logical connections between functional blocks. As used herein, two elements of a device are "logically connected" if packets are able to flow in at least one direction from one element to the other, either directly or via one or more intermediate elements, provided that the flow of packets occurs within the device. Additionally, as used herein, a first element "forwards" packets to a second element when packets flow from the first element to the second element, either directly or via one or more intermediate elements.

Device 100 may be a router, a remote access server, or other such device that forwards packets. Device 100 includes interfaces 102–106 that are able to transmit packets to and to receive packets from nodes 108–112, respectively. Nodes 108–112 may represent either hosts or packet-forwarding devices, such as routers, that are connected to device 100 via digital networks or via the PSTN. Note that although device 100 is shown in FIG. 2 with three interfaces 102–106, device 100 may have a greater or fewer number.

If device 100 is a router, at least one of nodes 108–112 will typically be a router or other device connected via a WAN, and another one of nodes 108–112 will typically be a host or other device connected via a LAN. If device 100 is a remote access server, at least one of interfaces 102–106 will include a modem, with the corresponding node being a user connected via the PSTN using a protocol such as PPP, and at least one other of interfaces 102–106 will be connected to a host or other device via a LAN or WAN.

Running on device 100 are internal applications 114, which typically serve to to control or configure device 100. Internal applications 114 communicate with other devices remote to device 100, through the use of protocols such as PPTP, L2TP, SNMP or Telnet. As part of such remote access, internal applications 114 generate internally-packets and use internally-destined packets. These internally-generated packets and internally-destined packets together constitute the "internal" packets. These internal packets are transmitted and received by one or more of interfaces 102–106.

In addition to such "internal" packets, interfaces 102–106 also transmit and receive "external" packets. The "external" packets are packets that are not associated with internal applications 114 but are, instead, destined for devices other than device 100. For example, if device 100 is a remote access server, node 108 may represent a remote user connected via the PSTN and node 110 may represent a server on a LAN or a WAN being accessed by the remote user. In that case, the packets associated with the remote user that are transmitted and received by interfaces 102 and 104 would all be external packets.

Packet classifiers 116–120, which are logically connected to interfaces 102–106, respectively, classify the packets received at interfaces 102–106 as either internally-destined or external packets, based on the destination address of the packets. In particular, the internally-destined packets will have a destination address that is one of the addresses assigned to device 100 itself. The external packets will have destination addresses that correspond to devices other than device 100. Packet classifiers 116–120 forward the internally-destined packets to an internal interface 122 and the external packets to a packet forwarder 124.

Internal interface 122 serves as an interface for internal applications 114. Internal interface 122 is preferably a pseudo interface implemented by software, rather than a physical interface. Internal interface 122 is logically connected to internal applications 114, via a policy engine 126, to packet forwarder 124, and to packet classifiers 116–120. Internal interface 122 forwards the internally-destined packets from packet classifiers 116–120 to internal applications 114 and forwards the internally-generated packets from internal applications 114 to packet forwarder 124.

Policy engine 126 applies a policy to the internal packets. Specifically, policy engine 126 examines one or more selector fields present in the internal packets. Typical selector fields include the source address, destination address, source port, destination port, and protocol type. Policy engine 126 also applies a set of rules specifying the manner in which a given packet should be handled if the selector fields of the given packet match certain predefined criteria. Such handling can include without limitation dropping the packet, logging the packet, encrypting or decrypting the packet, performing network address translation and/or port address translation on the packet, and prioritizing the packet for QoS. Policy engine 126 may apply a policy to internally-generated packets that differs from the policy apply to the internally-destined packets. However, policy engine 126 typically applies the same policy to internally-destined and internally-generated packets.

Packet forwarder 124 forwards the external packets from packet classifiers 116–120 and the internally-generated packets from internal interface 122 to one or more of interfaces 102–106. More particularly, packet forwarder 124 provides a routing functionality by determining to which of interfaces 102–106 to forward each packet, based on each packet's destination address. Packet forwarder 124 typically has access to routing tables to perform this routing.

Notably, device 100 applies policies to the internal packets, by means of policy engine 126, but does not apply policies to the external packets. This approach offers several advantages. Typically, most of the packets transmitted and received by device 100 will be external packets. In fact, internal packets comprise less than 5% of the traffic in most remote access servers. However, security and other policy-related concerns are most significant for the internal packets, because these packets, being associated with internal applications 114, can affect the configuration and management of device 100. Thus, by applying a policy only to internal packets, the packets for which policies are typically most important, the overhead and latency that would be associated with examining all packets is greatly reduced. Additionally, the task of policy management is simplified because policies are applied at only a single interface, internal interface 122, rather than at each of interfaces 102–106.

It is also possible to extend this approach to allow policies to be applied to the external packets as well as to the internal packets. A device 200 utilizing this approach is shown in FIG. 3. Device 200 includes interfaces 202–206 that transmit packets to and receive packets from nodes 208–212, respectively. Packet classifiers 214–218 classify the packets received by nodes interfaces 202–206, respectively, as either internally-destined packets or external packets, based on the packets destination addresses. Packet classifiers 214–218 forward the internally-destined packets to an internal interface 220, and packet classifiers 214–218 forward the external packets to a packet forwarder 222 via policy engines 224–228, respectively.

Internal interface 220 is logically connected to packet classifiers 214–218, to packet forwarder 222, and to internal applications 230 via a policy engine 232. Internal interface 220 forwards the internally-destined packets from packet classifiers 214–218 to internal applications 230 and forwards the internally-generated packets from internal applications 230 to packet forwarder 222.

Packet forwarder 222 performs a routing functionality, forwarding the external packets from packet classifiers 214–218 and the internally-generated packets from internal interface 220 to one or more of interfaces 202–206, via policy engines 224–228, based on the destination addresses of the packets.

Policy engine 232 applies a policy to the internal packets, i.e., the internally-generated packets generated by internal applications 230 and the internally-destined packets used by internal applications 230. Policy engines 224–228 apply policies to the external packets forwarded by packet classifiers 214–218, respectively. Policy engines 224–228 typically also apply policies to the external packets forwarded by packet forwarder 222.

In this way, device 200 applies policies to the internal packets and to the external packets. In general, the policies applied to the internal and external packets may differ. The approach used in device 200 may not realize the efficiency advantage afforded by the approach used in device 100. However, by applying policies to internal packets using policy engine 232, regardless of which of interfaces 202–206 may transmit or receive the packet, the task of policy management is greatly simplified.

Although various embodiments of this invention have been shown and described, it should be understood that various modifications and substitutions, as well as rearrangements and combinations of the preceding embodiments, can be made by those skilled in the art, without departing from the novel spirit and scope of this invention. Accordingly, the true spirit and scope of the invention is defined by the appended claims, to be interpreted in light of the foregoing specification.

We claim:

1. In a packet-forwarding device running an internal application and having a first interface and a second interface, a method for providing policy-based services, said method comprising the steps of:

said internal application generating internally-generated packets;

applying a first policy to said internally-generated packets;

forwarding said internally-generated packets to said first interface;

receiving second incoming packets at said second interface, said second incoming packets having destination addresses;

classifying said second incoming packets as internally-destined packets if said destination addresses of said second incoming packets are in a first set of one or more addresses and classifying said second incoming packets as second external packets if said destination addresses of said second incoming packets are in a second set of one or more addresses; and forwarding said second external packets to said first interface without applying said first policy to said second external packets.

2. The method of claim 1, wherein said step of applying a first policy to said internally-generated packets includes the steps of:

examining at least one selector field in each one of said internally-generated packets; and handling said internally-generated packets in a predetermined manner if said selector fields of said internally-generated packets meet predetermined criteria.

3. The method of claim 2, wherein said at least one selector field is selected from the group consisting of source address, destination address, source port, destination port, and protocol type.

4. The method of claim 2, wherein said step of handling said internally-generated packets in a predetermined manner includes the step of dropping said internally-generated packets.

5. The method of claim 2, wherein said step of handling said internally-generated packets in a predetermined manner includes the step of translating the source addresses and destination addresses of said internally-generated packets.

6. The method of claim 2, wherein said step of handling said intenally-generated packets in a predetermined manner includes the step of encrypting said internally-generated packets.

7. The method of claim 2, wherein said step of handling said internally-generated packets in a predetermined manner includes the step of prioritizing said internally-generated packets.

8. The method of claim 1, further comprising the step of:
applying a second policy to said second external packets, said second policy differing from said first policy.

9. The method of claim 1, further comprising the steps of:
applying a third policy to said internally-destined packets; and
forwarding said internally-destined packets to said internal application.

10. The method of claim 9, wherein said step of applying a third policy to said internally-destined packets includes the steps of:
examining at least one selector field in each one of said internally-destined packets; and
handling said internally-destined packets in a predetermined manner if said selector fields of said internally-destined packets meet predetermined criteria.

11. The method of claim 10, wherein said at least one selector field is selected from the group consisting of source address, destination address, source port, destination port, and protocol type.

12. The method of claim 10, wherein said step of handling said internally-destined packets in a predetermined manner includes the step of dropping said internally-destined packets.

13. The method of claim 10, wherein said step of handling said internally-destined packets in a predetermined manner includes the step of translating the source addresses and destination addresses of said internally-destined packets.

14. The method of claim 10, wherein said step of handling said internally-destined packets in a predetermined manner includes the step of decrypting said internally-destined packets.

15. The method of claim 10, wherein said step of handling said internally-destined packets in a predetermined manner includes the step of prioritizing said internally-destined packets.

16. The method of claim 8, further comprising the steps of:
receiving first incoming packets at said first interface, said first incoming packets having destination addresses;
classifying said first incoming packets as internally-destined packets if said destination addresses of said first incoming packets are in said first set of one or more addresses and classifying said first incoming packets as first external packets if said destination addresses of said first incoming packets are in said second set of one or more addresses; and
applying a fourth policy to said first external packets, said fourth policy differing from said first policy.

17. The method of claim 1, wherein said second set of one or more addresses includes at least one address assigned to said packet-forwarding device.

18. In a packet-forwarding device running an internal application and having a first interface and a second interface, a method for providing policy-based services, said method comprising the steps of:
receiving incoming packets at said first interface, each one of said incoming packets having an address;
classifying said incoming packets as internally-destined packets if said addresses of said incoming packets are in a first set of addresses and classifying said incoming packets as first external packets if said addresses of said incoming packets are in a second set of addresses;
applying a first policy to said internally-destined packets;
forwarding said internally-destined packets to said internal application;
forwarding said first external packets to said second interface without applying said first policy to said first external packets.

19. The method of claim 18, wherein said step of applying a first policy to said internally-destined packets includes the steps of:
examining at least one selector field in each one of said internally-destined packets; and
handling said internally-destined packets in a predetermined manner if said selector fields of said internally-destined packets meet predetermined criteria.

20. The method of claim 19, wherein said step of handling said internally-destined packets in a predetermined manner includes the step of dropping said internally-destined packets.

21. The method of claim 19, wherein said step of handling said internally-destined packets in a predetermined manner includes the step of translating the source addresses and destination addresses of said internally-destined packets.

22. The method of claim 19, wherein said step of handling said internally-destined packets in a predetermined manner includes the step of encrypting said internally-destined packets.

23. The method of claim 19, wherein said step of handling said internally-destined packets in a predetermined manner includes the step of prioritizing said internally-destined packets.

24. The method of claim 18, further comprising the step of:
applying a second policy to said first external packets, said second policy differing from said first policy.

25. The method of claim 18, further comprising the steps of:
said internal application generating internally-generated packets;
applying a third policy to said internally-generated packets;
forwarding said internally-generated packets to said first interface;
receiving second external packets at said second interface; and
forwarding said second external packets to said first interface without applying said third policy to said second external packets.

26. The method of claim 25, further comprising the step of applying a fourth policy to said second external packets, said fourth policy differing from said third policy.

27. The method of claim 19, wherein said at least one selector field is selected from the group consisting of source address, destination address, source port, destination port, and protocol type.

28. The method of claim 18, wherein said second set of addresses includes at least one address assigned to said packet-forwarding device.

29. A packet-forwarding device comprising:
- a first interface for transmitting first outgoing and receiving first incoming packets;
- a second interface for transmitting second outgoing and receiving second incoming packets;
- an internal application running on said packet-forwarding device, said internal application generating internally-generated packets and using internally-destined packets;
- an internal interface logically connected to said internal application, said internal interface forwarding said internally-generated packets to said first interface, said internal interface forwarding said internally-destined packets to said internal application;
- a packet forwarder logically connected to said first interface and to said second interface, said packet forwarder forwarding packets between said first and second interfaces;
- a first packet classifier logically connected to said first interface, said internal interface, and said packet forwarder, said first packet classifier classifying said first incoming packets as first internally-destined packets if destination addresses in said first incoming packets are in a first set of one or more addresses and classifying said first incoming packets as first external packets if destination addresses in said first incoming packets are in a second set of one or more addresses, said first packet classifier forwarding said first internally-destined packets to said internal interface, said packet classifier forwarding said first external packets to said packet forwarder;
- a second packet classifier logically connected to said second interface, said internal interface, and said packet forwarder, said second packet classifier classifying said second incoming packets as second internally-destined packets if destination addresses in said second incoming packets are in said first set of one or more addresses and classifying said second incoming packets as second external packets if destination addresses in said second incoming packets are in said second set of one or more addresses, said second packet classifier forwarding said second internally-destined packets to said internal interface, said packet classifier forwarding said second external packets to said packet forwarder, and
- a first policy engine logically connected to said internal interface and to said internal application, said first policy engine applying a first policy to internal packets, said internal packets being selected from the group consisting of said internally-generated packets and said internally-destined packets.

30. The device of claim 29, further comprising a second policy engine logically connected to said first packet classifier and to said packet forwarder, said second policy engine applying a second policy to said first external packets.

31. The device of claim 30, further comprising a third policy engine logically connected to said second packet classifier and to said packet forwarder, said third policy engine applying a third policy to said second external packets.

32. The device of claim 29, wherein said first policy engine examines at least one selector field in each of one of said internal packets and handles said internal packets in a predetermined manner if said selector fields of said internal packets meets predetermined criteria.

33. The device of claim 32, wherein said at least one selector field is selected from the group consisting of source address, destination address, source port, destination port, and protocol type.

34. The device of claim 32, wherein said first policy engine drops said internal packets if said selector fields of said internal packets meet predetermined criteria.

35. The device of claim 32, wherein said first policy engine translates the source and destination addresses of said internal packets if said selector fields of said internal packets meet predetermined criteria.

36. The device of claim 32, wherein said first policy engine encrypts said internal packets if said selector fields of said internal packets meet predetermined criteria.

37. The device of claim 32, wherein said first policy engine decrypts said internal packets if said selector fields of said internal packets meet predetermined criteria.

38. The device of claim 32, wherein said first policy engine prioritizes said internal packets if said selector fields of said internal packets meet predetermined criteria.

39. In a packet-forwarding device having a first interface, a second interface, a packet forwarder forwarding packets between said first and second interfaces, and running an internal application, said internal application generating internally-generated packets and using internally-destined packets, an improvement comprising:
- at least one packet classifier logically connected to said first and second interfaces, said at least one packet classifier classifying received packets received by said first and second interfaces as internal packets or external packets based on destination addresses in said received packets;
- an internal interface logically connected to said internal application and said at least one packet classifier; and
- a policy engine logically connected to said internal interface, said policy engine applying a policy to said internal packets.

40. The improvement of claim 39, wherein said at least one packet classifier forwards said internal packets to said internal interface and forwards said external packets to said packet forwarder.

41. The improvement of claim 39, wherein said at least one packet classifier includes a first packet classifier logically connected to said first interface and a second packet classifier logically connected to said second interface.

42. The improvement of claim 39, wherein
said policy engine examines at least one selector field in each of one of said internal packets and handles said internal packets in a predetermined manner if said selector fields of said internal packets meets predetermined criteria.

43. The improvement of claim 42, wherein said at least one selector field is selected from the group consisting of source address, destination address, source port, destination port, and protocol type.

44. The improvement of claim 42, wherein said policy engine drops said internal packets if said selector fields of said internal packets meet predetermined criteria.

45. The improvement of claim 42, wherein said policy engine translates the source and destination addresses of said internal packets if said selector fields of said internal packets meet predetermined criteria.

46. The improvement of claim 42, wherein said policy engine encrypts said internal packets if said selector fields of said internal packets meet predetermined criteria.

47. The improvement of claim 42, wherein said policy engine decrypts said internal packets if said selector fields of said internal packets meet predetermined criteria.

48. The improvement of claim 42, wherein said policy engine prioritizes said internal packets if said selector fields of said internal packets meet predetermined criteria.

* * * * *